US005382891A

United States Patent [19]

Huffener

[11] Patent Number: 5,382,891

[45] Date of Patent: Jan. 17, 1995

[54] MAN/MACHINE INTERFACE

[76] Inventor: Guy S. Huffener, Krelttmayr Str. 28, D-8000 Munchen 2, Germany

[21] Appl. No.: 910,253

[22] PCT Filed: Nov. 13, 1990

[86] PCT No.: PCT/EP90/01894

§ 371 Date: Jul. 13, 1992

§ 102(e) Date: Jul. 13, 1992

[87] PCT Pub. No.: WO92/09069

PCT Pub. Date: May 29, 1992

[51] Int. Cl.[6] .............................................. H02P 1/00

[52] U.S. Cl. ................................ 318/269; 318/369; 318/569; 318/551; 318/824; 84/601; 84/602; 84/644; 84/645

[58] Field of Search ............... 318/569, 269, 369, 824, 318/807, 842, 551; 84/601, 602, 644, 645, 670, 721, 746

[56] References Cited

U.S. PATENT DOCUMENTS 4,692,676 9/1987 Dohi et al. .......................... 318/269
4,732,099 3/1988 Neki et al. .......................... 318/369
4,749,923 6/1988 Chieng ................................ 318/269
5,180,954 1/1993 Wekana et al. ...................... 318/369
5,189,968 3/1993 Eichenseer .......................... 318/569

*Primary Examiner*—Jonathan Wysocki
*Assistant Examiner*—Karen Masih
*Attorney, Agent, or Firm*—Bachman & LaPointe

[57] ABSTRACT

In a system including clock pulse data such as a network for sequencing music or multi-media data, a man/machine interface is provided which can be driven either by the operator or by a motor and transmission system. The man/machine interface contains encoders for producing tempo clock data which can be varied by the operator. Based on the comparison of the output signals of the encoders, the motor is accelerated or decelerated to eliminate the difference between the outputs of the encoders. The man/machine interface can be operated in the slave mode in which tempo clock data generated in the network is used to control the speed of operation of the man/machine interface or in the master mode when the man/machine interface determines the timing. The man/machine interface is preferably a foot-pedal.

9 Claims, 14 Drawing Sheets

Figure 8:
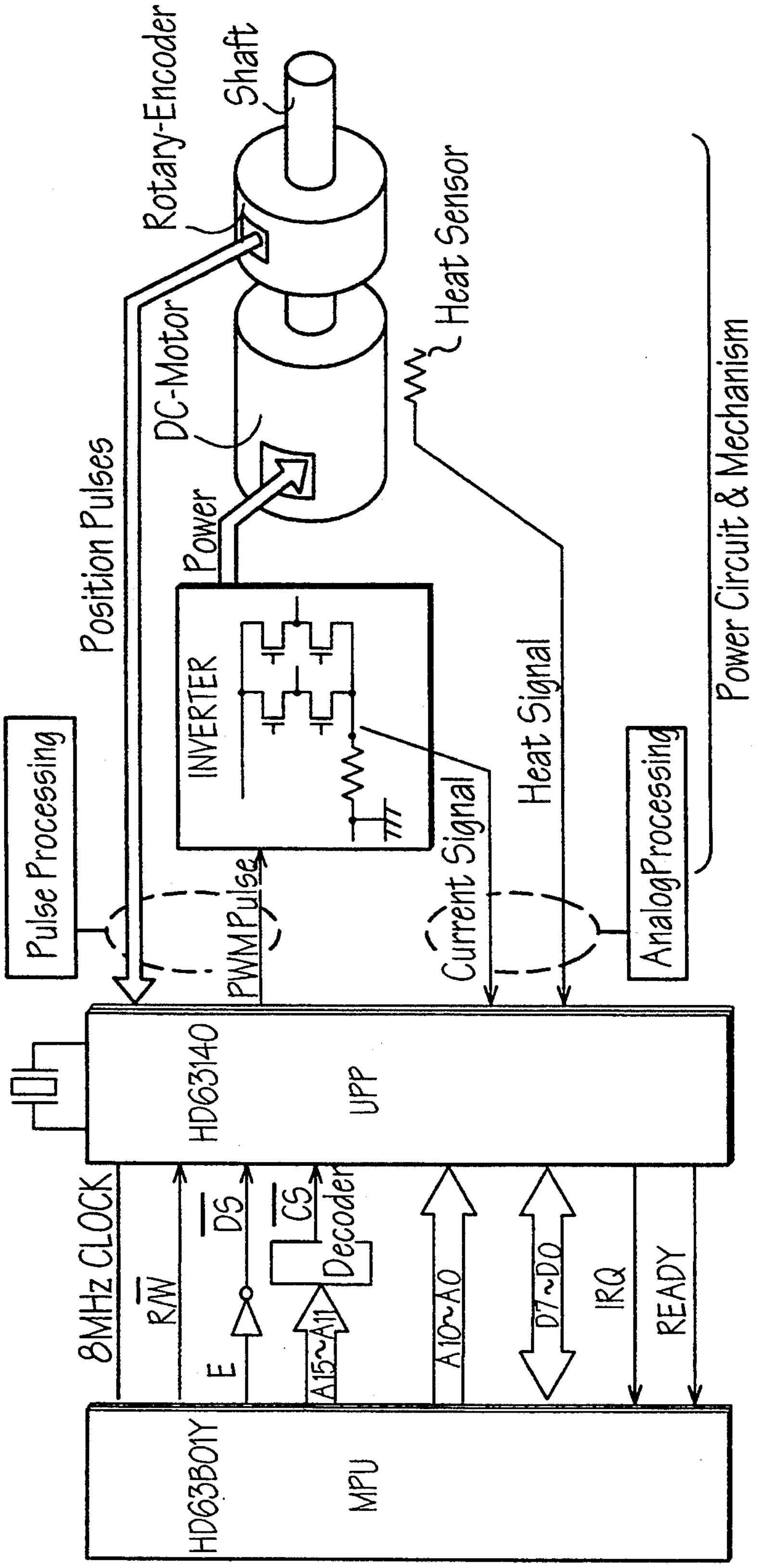

FIG,1
Prior Art
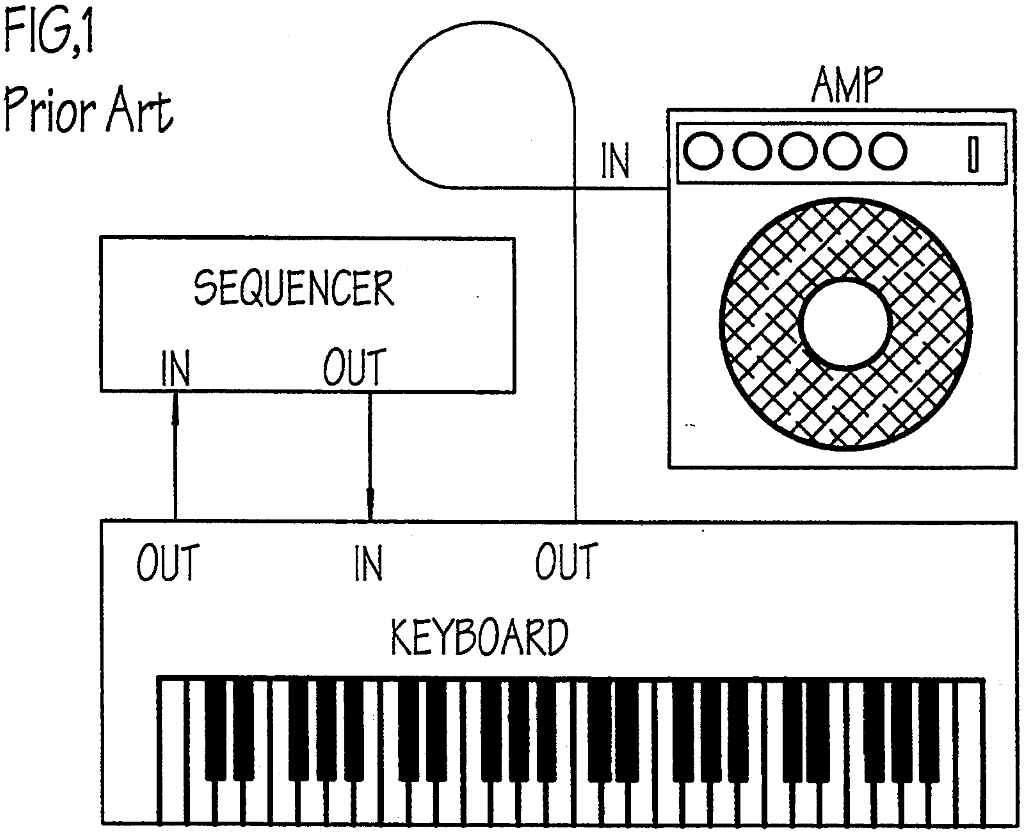
FIG.2
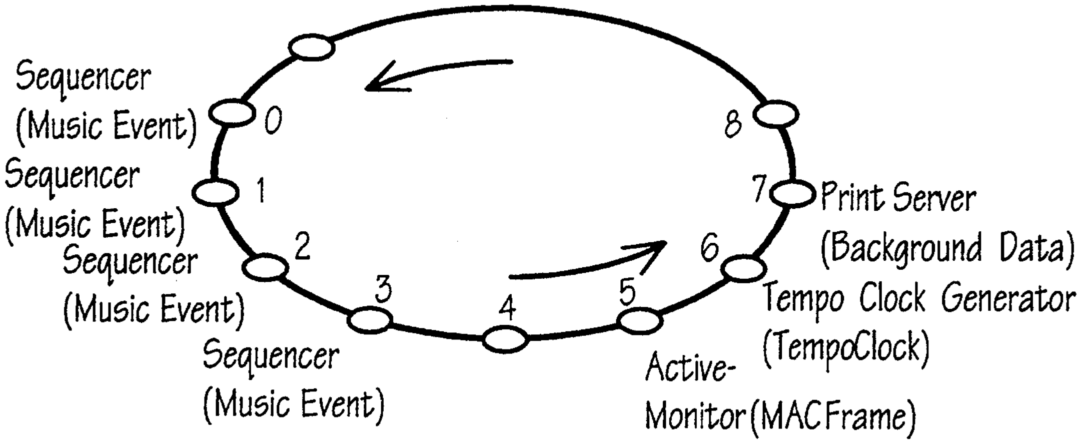

FIG,3
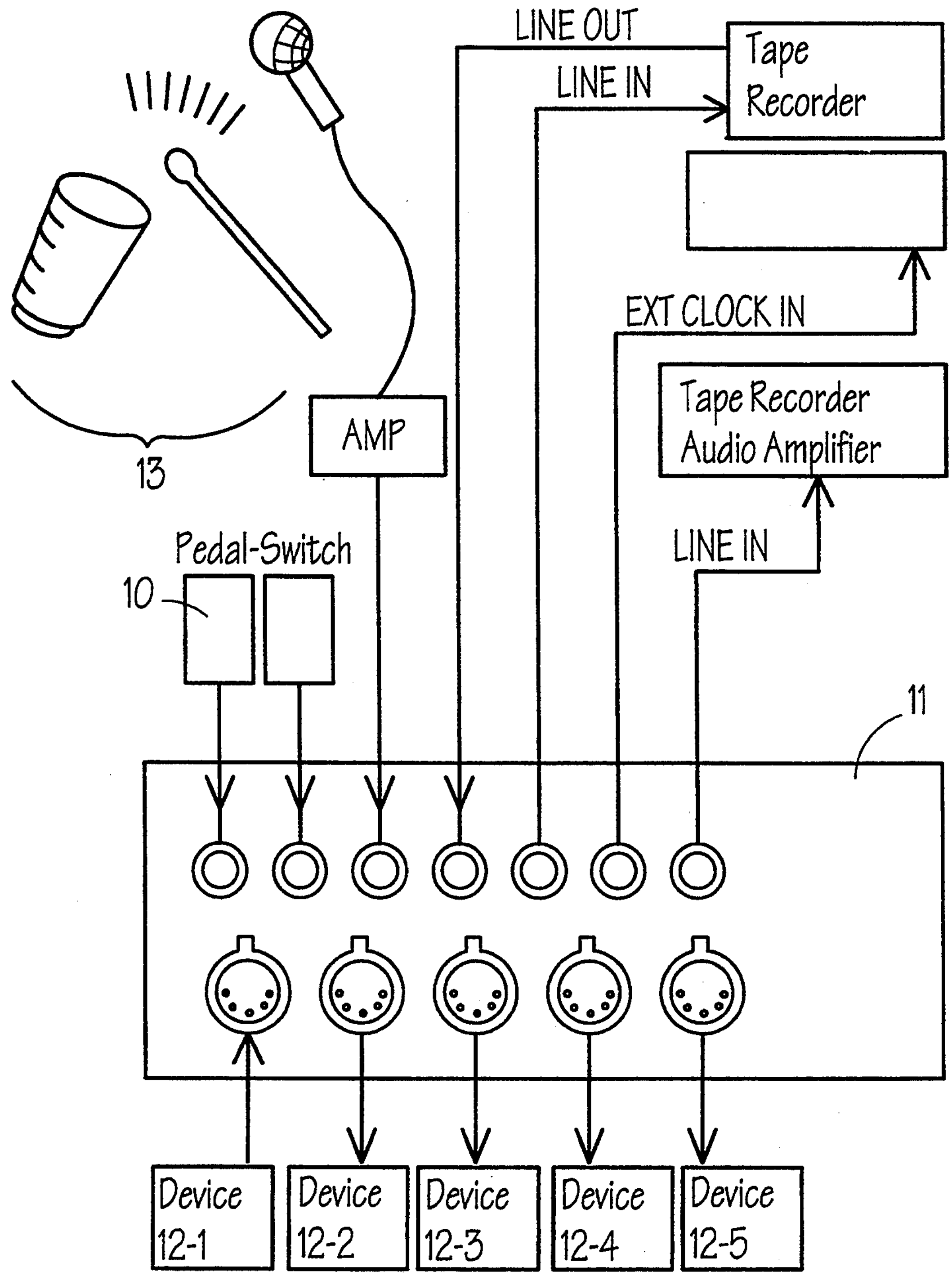
Prior Art

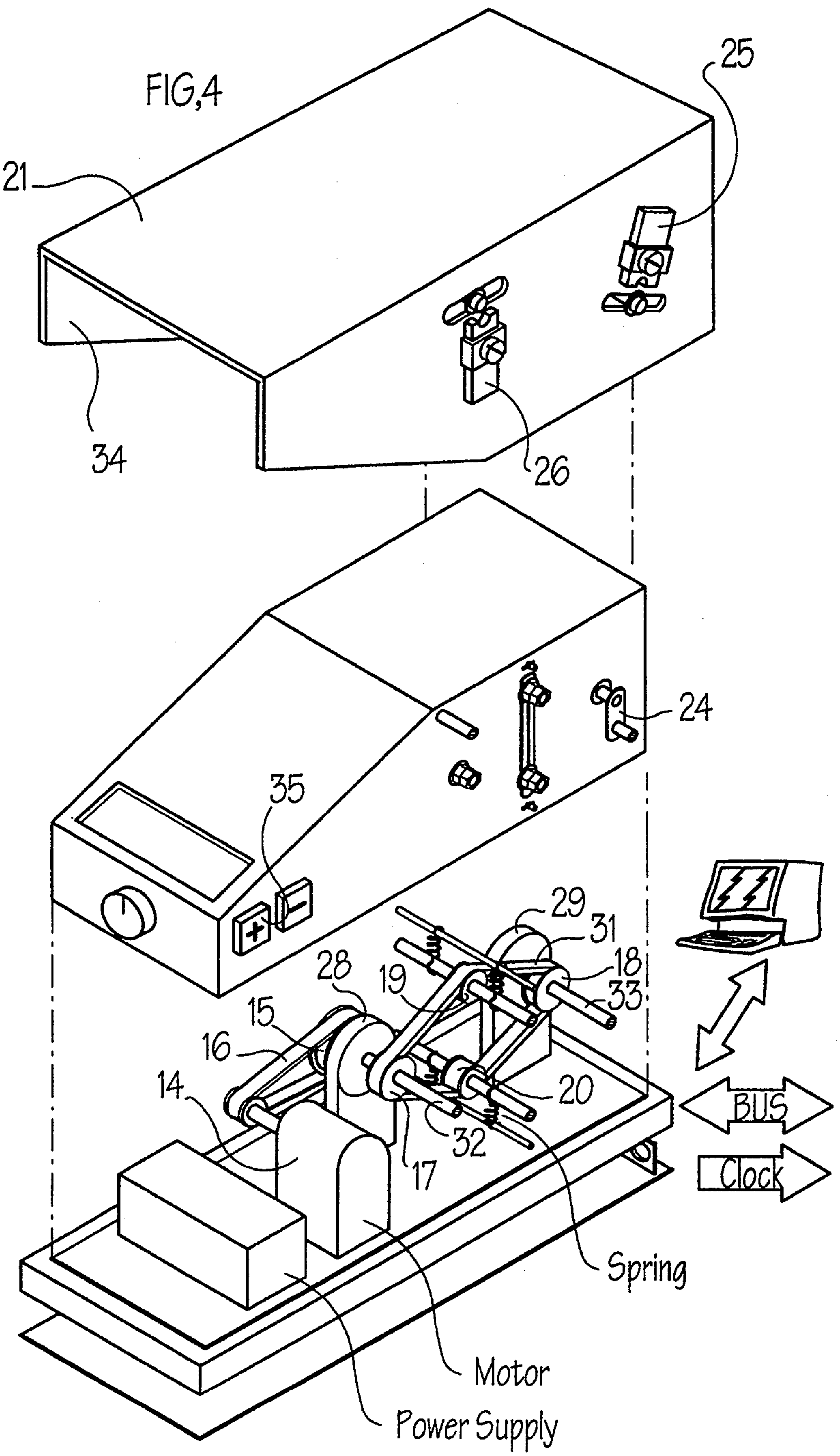
FIG,4
21
25
34
26
24
35
29
31
18
33
28
19
15
16
14
20
32
17
BUS
Clock
Spring
Motor
Power Supply

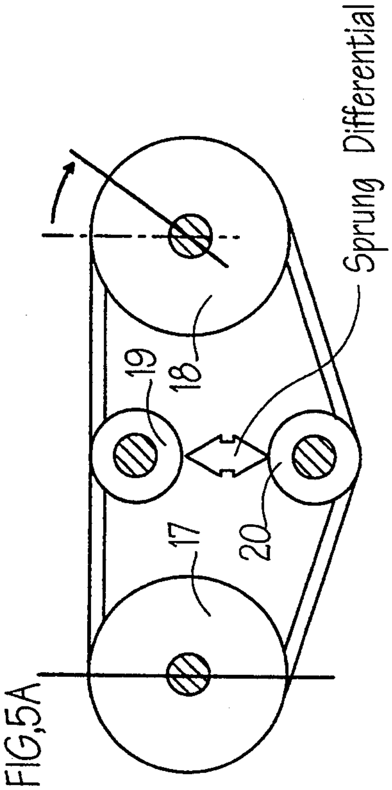
FIG,5A
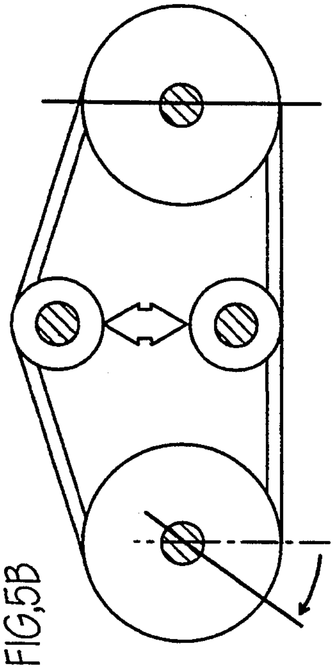
FIG,5B
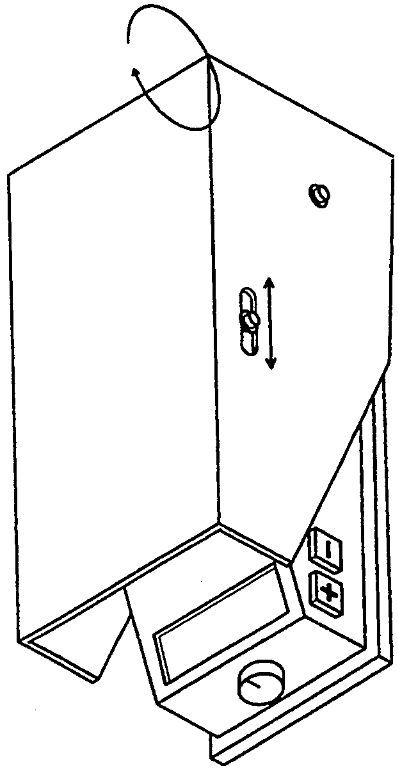
FIG,6A
SCROLL
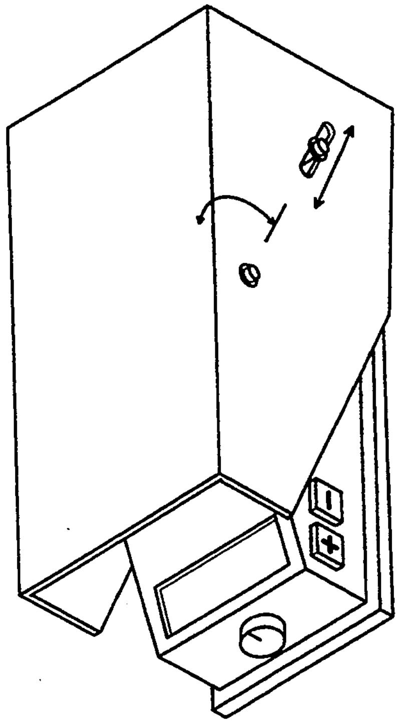
FIG,6B
TAP

FIG,7A
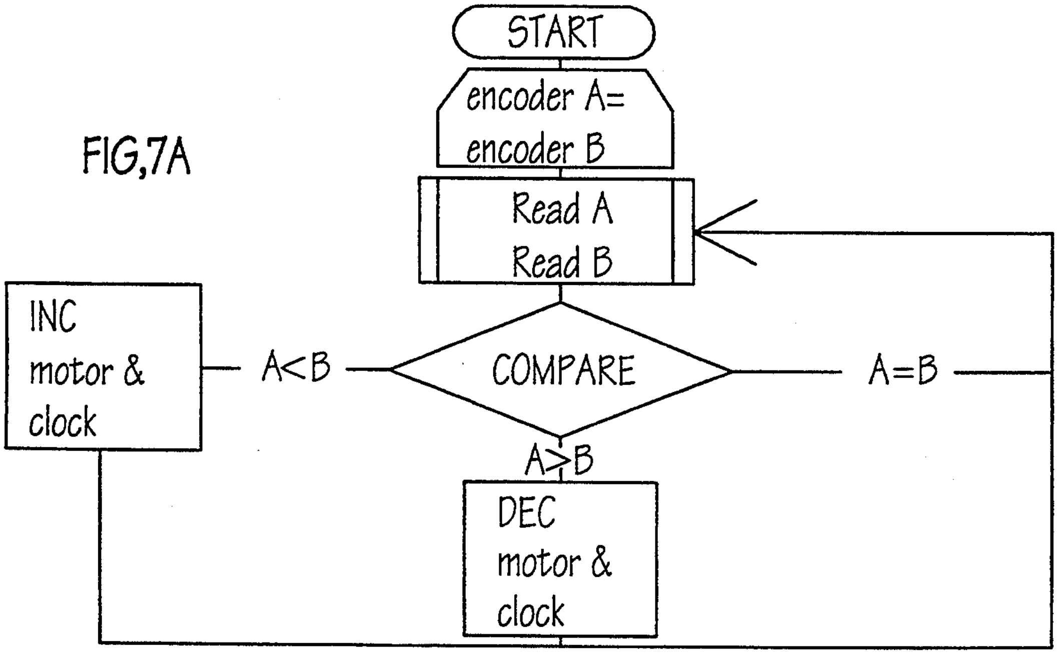
FIG,7B
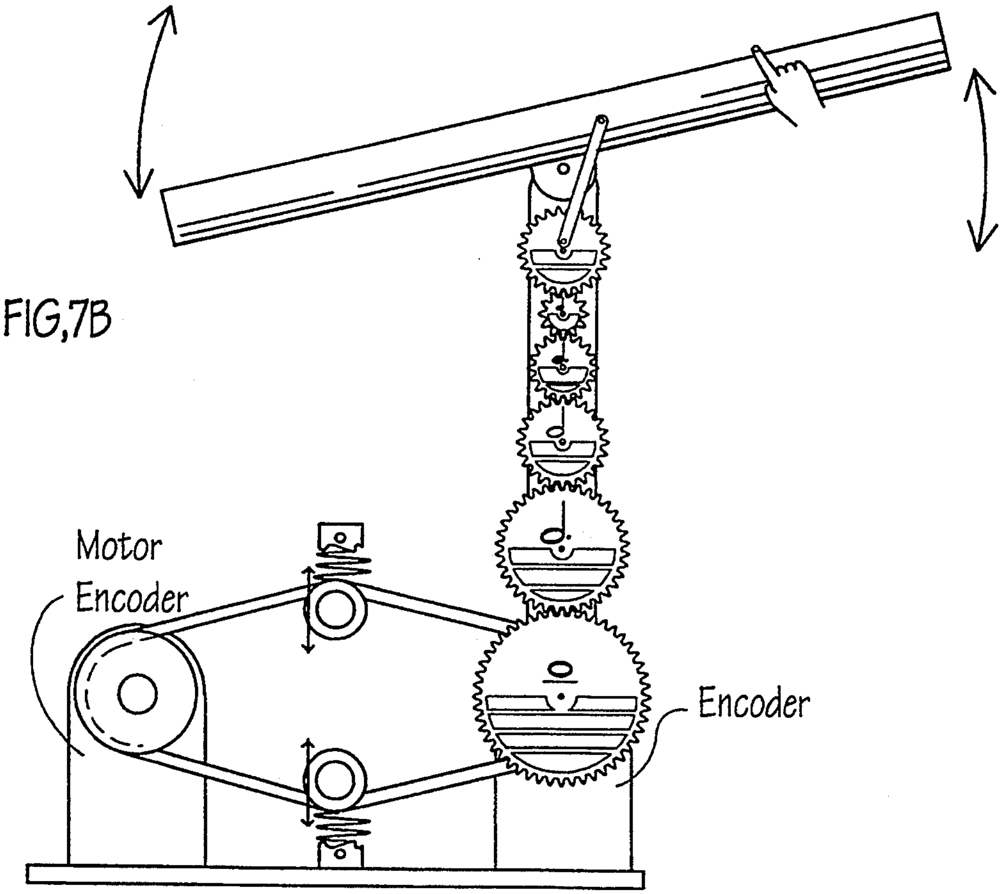

FIG,10
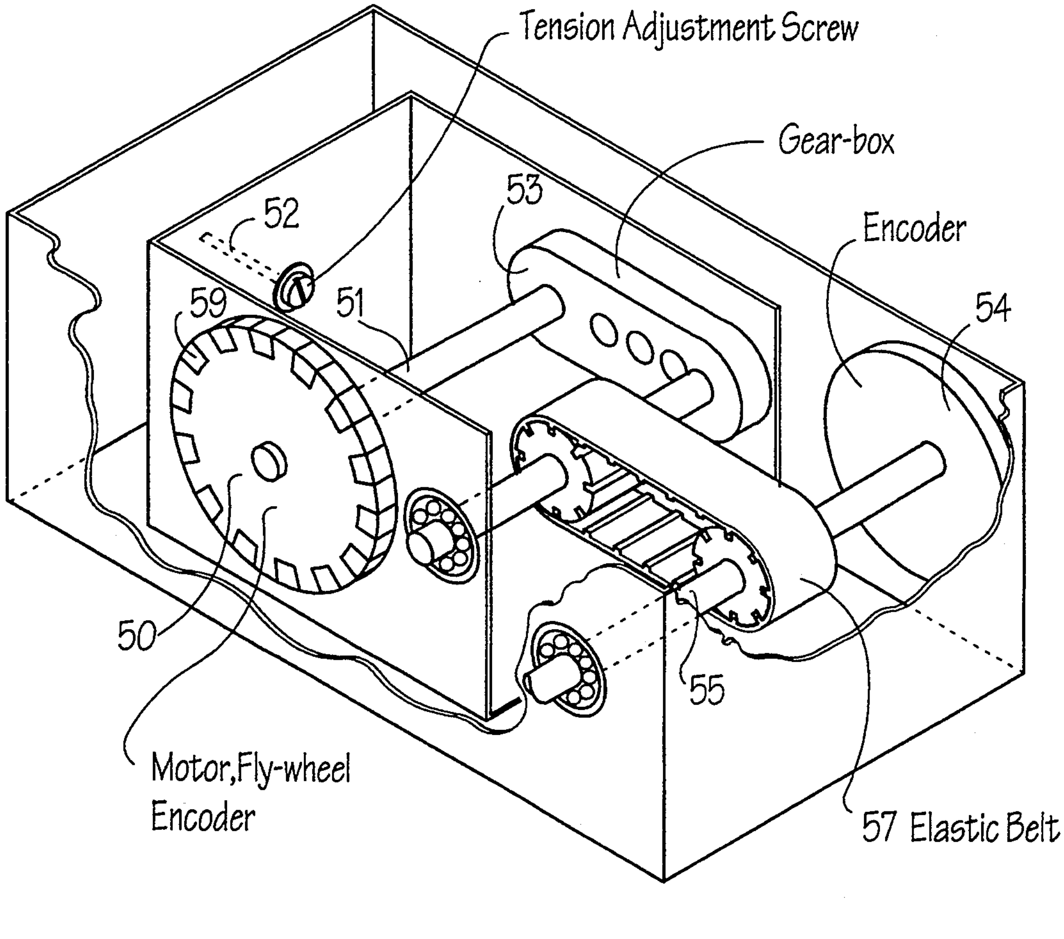

FIG,14
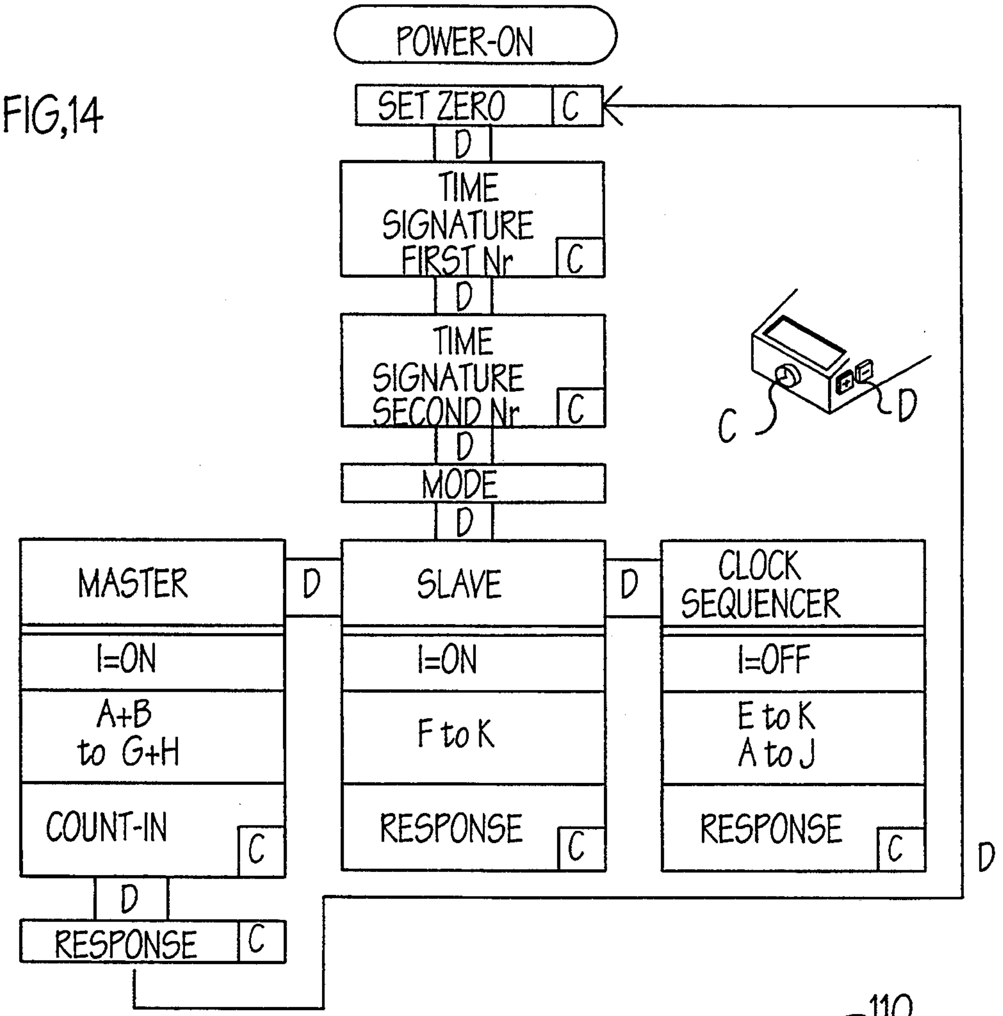
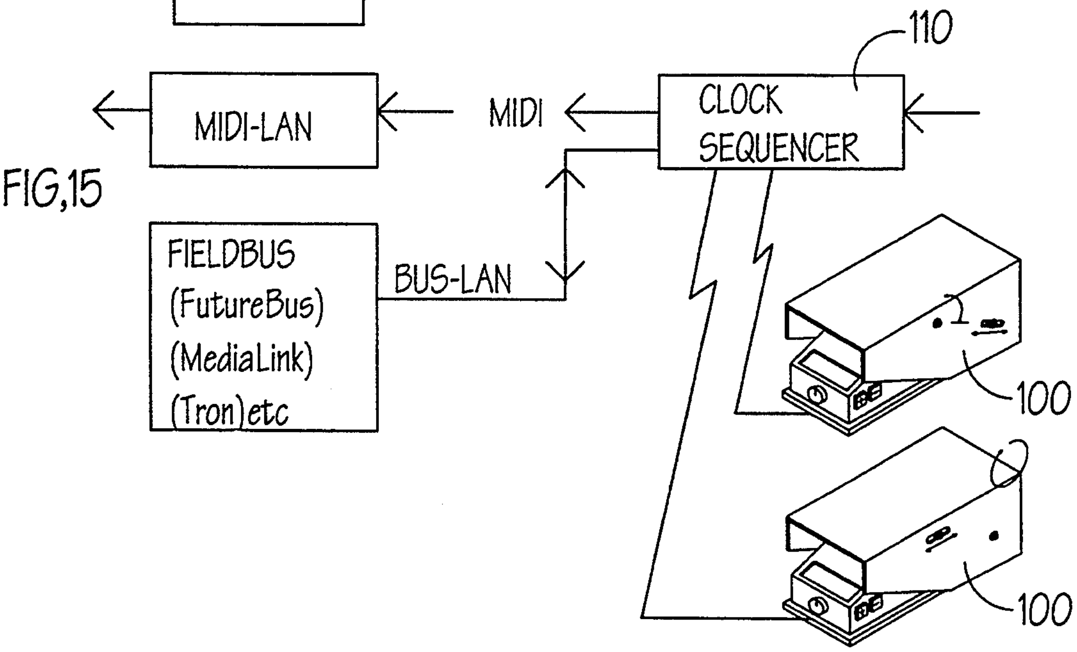
FIG,15

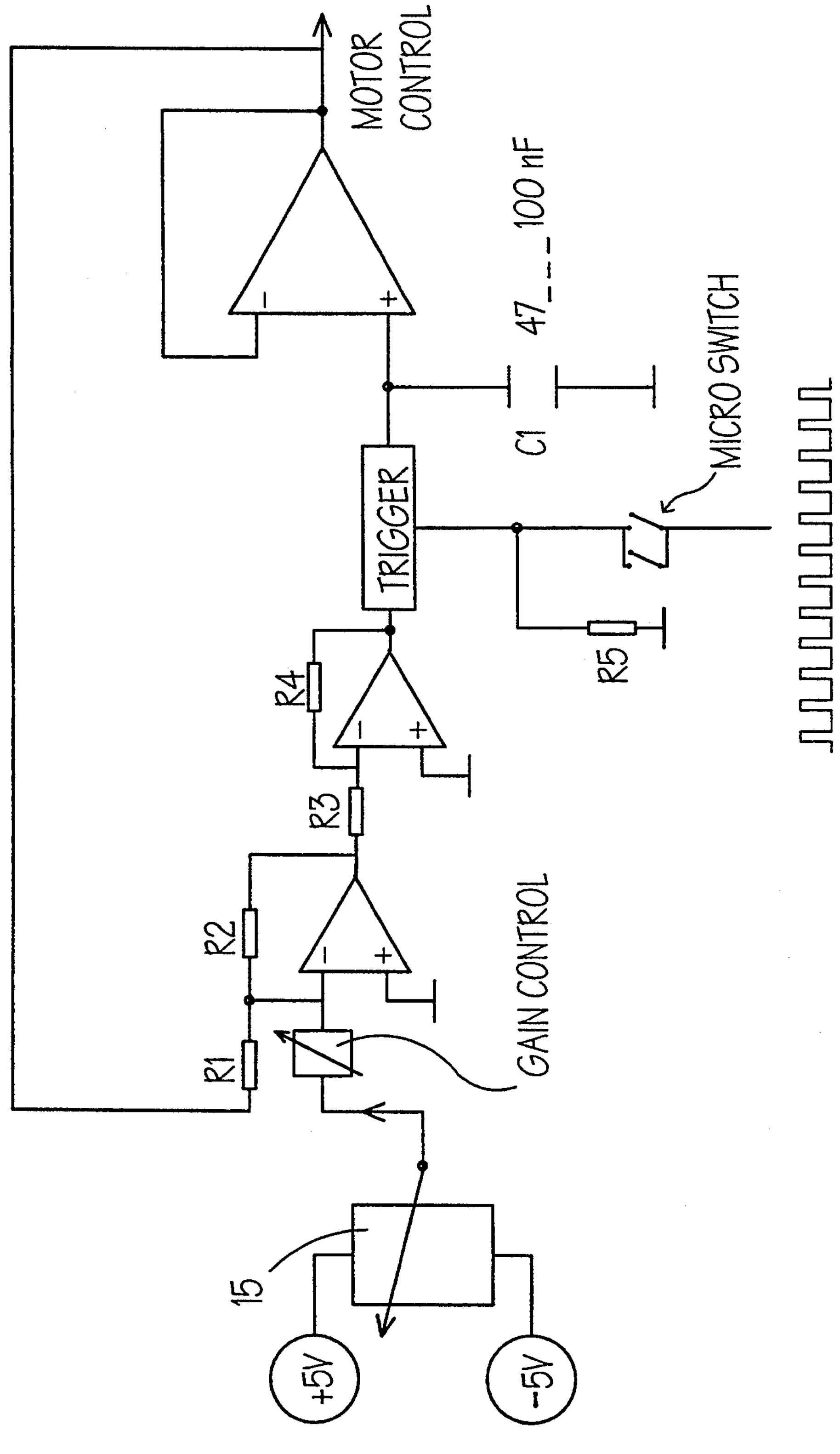
FIG,17

MAN/MACHINE INTERFACE

The invention relates to a system for on-line control of clock pulse data in a computer or microprocessor-related system and in particular, to a man-machine interface which is capable of controlling clock pulse data. The invention is particularly suitable for use with music synthesizers.

The majority of man-machine interfaces do not operate at real time. The reason for this is that the majority of computer systems are not capable of carrying out complex operations at the same speed as the human brain. In the last half of a decade considerable improvements have been achieved with the speed of operation of microprocessors and computers and it is now possible for computer systems including robots to be designed which are capable of carrying out human functions at real time speed. For example, it is possible to design a robot system in which the robot is capable of reading and playing music at the same speed as a human would play. Such robotic systems open up a whole series of possibilities for combining human and robotic behaviour. The robots may be active as described above or may be passive, for example, a music synthesizer capable of reproducing musical sounds from preprogrammed and/or prerecorded digital data. Independent of whether these devices are active or passive the speed of operation of the system is determined by clock pulse data. The machine-like accuracy of this clock pulse data can result in problems when human beings have to operate with a computer controlled machine. As the speed of operation of computers increases and the applications in which real time computing must be synchronized with human behaviour also increase, there is a need to be able to control a real time active or passive robot so that the speed of operation can be flexibly altered in accordance with human requirements.

In the following, embodiments will be described with relation to musical synthesizers and multi-media systems. The present invention is however not limited to these kind of devices but may be used as a man-machine interface with any clock pulse controlled system.

The simplest form of music sequencing system is shown in FIG. 1 in which a musical instrument or keyboard for inputting musical data into a sequencer is connected to the sequencer and also to an amplifier and recording device. With this kind of sequencing device data relating to each musical instrument or musical part, must be entered separately. The musical data may be entered directly from a musical instrument such as the keyboard of an electronic organ or the information may be inputted directly using a computer terminal. This system is extremely time consuming and laborious if several different parts are to be played simultaneously such as occurs with orchestral music. Such a system (MIDI) is known from "MIDI" in Theorie and Praxis" Elecktor Verlag, 1990.

A more advanced and complex conventional system is shown in FIG. 2 in which a series of sequences (0, 1, 2, 3,) or electronic musical instruments are connected together as well as a tempo clock generator (6) which products time impulses which control the operation of the sequences (0, 2, 3). In this way, a plurality of musical parts may be replayed simultaneously. Further, by programming the tempo clock generator it is possible to alter the tempo of the music during play back. The system is organised as a local area network (LAN) in which musical performance frames travel along the loop, each frame containing digital information relating to the musical notes, timing, start and stop of the note as well as identification data for the receiving device. The node (6) typically despatches tempo click information at the clock rate of one 96th of a note duration. A typical tempo is 160 gpm (quarter notes per minute) which means that one 96th of a note duration is 15.265 milliseconds. Node (6) therefore despatches clock frames every 15.625 milliseconds. The node (6) is a master of total performance, and the tempo of each sequencer is controlled by the reception of tempo click information from the master. Such a system is known from "TRONSPROJECT 1987", K. Sakamura, Springer Verlag.

The disadvantage of this system is that all musical and tempo data must be prerecorded or preprogrammed. This means that the individual musicians or composers must record their particular parts separately which results in a great deal of the spontaneity of live performances being lost. Further, in order to programme the sequencers correctly, a considerable knowledge of the software and computer programming is required in addition to musical creativity which is a considerable restriction to modern musicians and composers.

A further problem occurs when a live performance is attempted in which musicians play simultaneously with electronically recorded music. In this situation the electronic exactness of the tempo clock generator (6) forces the live musicians to accompany the electronic device rather than the electronic device assisting and accompanying the live music created by the musicians.

There has therefore been a long term need to provide a system in which musicians and sequencers can interact in a flexible mode so that tempo alterations may be determined during the live performance by the musicians rather than the musicians being forced to accept the tempo dictated by the electronic device.

FIG. 3 shows a further conventional device which forms part of the network or musical instrument digital interface and is capable of controlling the tempo of the tempo clock generator (6) of FIG. 2. The device shown in FIG. 3 consists of a programmable tempo controller (11) which is connected to a series of devices (12-1) to (12-5). Such a tempo controller is manufactured by Roland (SBX-80, Sync Box). The tempo of the music to be played can be determined by an internal timing circuit or can be determined by a pedal switch (10) or an external accoustic signal generation means (13). The tempo generating means (10,13) are designed to give beats of the bar rather than the one 96th note duration of the tempo click information required by the tempo clock generator (6) of FIG. 2. Tempo alterations can therefore only be detected from beat to beat and not within a beat period. The tempo controller has therefore difficulty in following tempo changes exactly and has a particular difficulty in following tempo changes within one bar of the music. It is possible to compensate for this defect by more complicated software which then interpolates between the beats. However, this solution is obviously not satisfactory.

With the above systems there is a problem in editing the recorded timing data and in particular, there is no system known for real time editing of the prerecorded time data. The methods customarily used with the "MIDI" synthesizer system, for instance, the "CUBASE" or "M.ROS" involve individual alteration of the timing data on a non real time basis. With these systems each frame containing the digital information relating to the musical notes and timing is recalled and an amendment is made to the frame. The synchronisation of recorded music to a previously tapped beat sequence can be carried out automatically. This system is extremely time consuming and tedious and lacks any form of spontaneity in the playing of music. As mentioned above, this problem is not limited to music synthesizers but would be involved with any robot device which carried out on-line real time operations synchronized with other human behaviour.

The object of the present invention is therefore to provide a system in which human beings can interact with clock based controlled systems in such a way that the speed of operation of the system may be varied continuously in accordance with the requirements of the human being.

A further object of the invention is to provide a man-machine interface which provides precise information to the operator of the exact timing by providing tactile positional data.

A further object of the present invention is to provide a man-machine interface for operating with a clock pulse controlled system in order to sequence the activities of the system, whereby the man-machine interface generates timing data as required by the system for timing control.

A further object of the invention is to provide a man-machine interface which generates timing pulses in a continuously variable manner but is also capable of receiving timing pulses from other devices used in the system.

A further object of the invention is to provide a man-machine interface which is capable of editing prerecorded timing data on an on-line real time basis.

A further object of the present invention is to provide a system with which musicians can interact with musical sequencers in such a way that the tempo of the music may be varied continuously.

A further object of the invention is to provide a footpedal for operation in a system for sequencing music, which generates tempo click information at the clock rate as required by the sequencers for timing control.

A further object of the invention is to provide a tempo clock generator whose timing is continuously variable but is also capable of receiving tempo signals from other sequencers or other time clock generators used in the musical system, and is also capable of operating in a master or slave mode. The objects of the present invention are solved by man/machine interfaces in accordance with the details of claim 1 or claim 7.

Further advantageous embodiments and features of the present invention are included in the dependent claims.

The present invention is described in more detail in the following with reference to the drawings in which FIG. 1 shows a conventional simple music sequencing system, FIG. 2 shows the loop configuration of a typical music sequencing system, FIG. 3 shows a conventional sequencer with external tempo clock generating means, FIG. 4 shows a general view of a switch according to the present invention, FIGS. 5*a* and 5*b* show details of one embodiment of the switch according to the present invention, FIGS. 6*a* and 6*b* show the movement of the switch according to two embodiments of the present invention, FIG. 7*a* shows a comparison circuit operation used for controlling the driving means of the switch according to the present invention, FIG. 7*b* shows a further embodiment of the present invention, FIG. 8 shows a motor control means suitable for use with the present invention.

Figure 9:
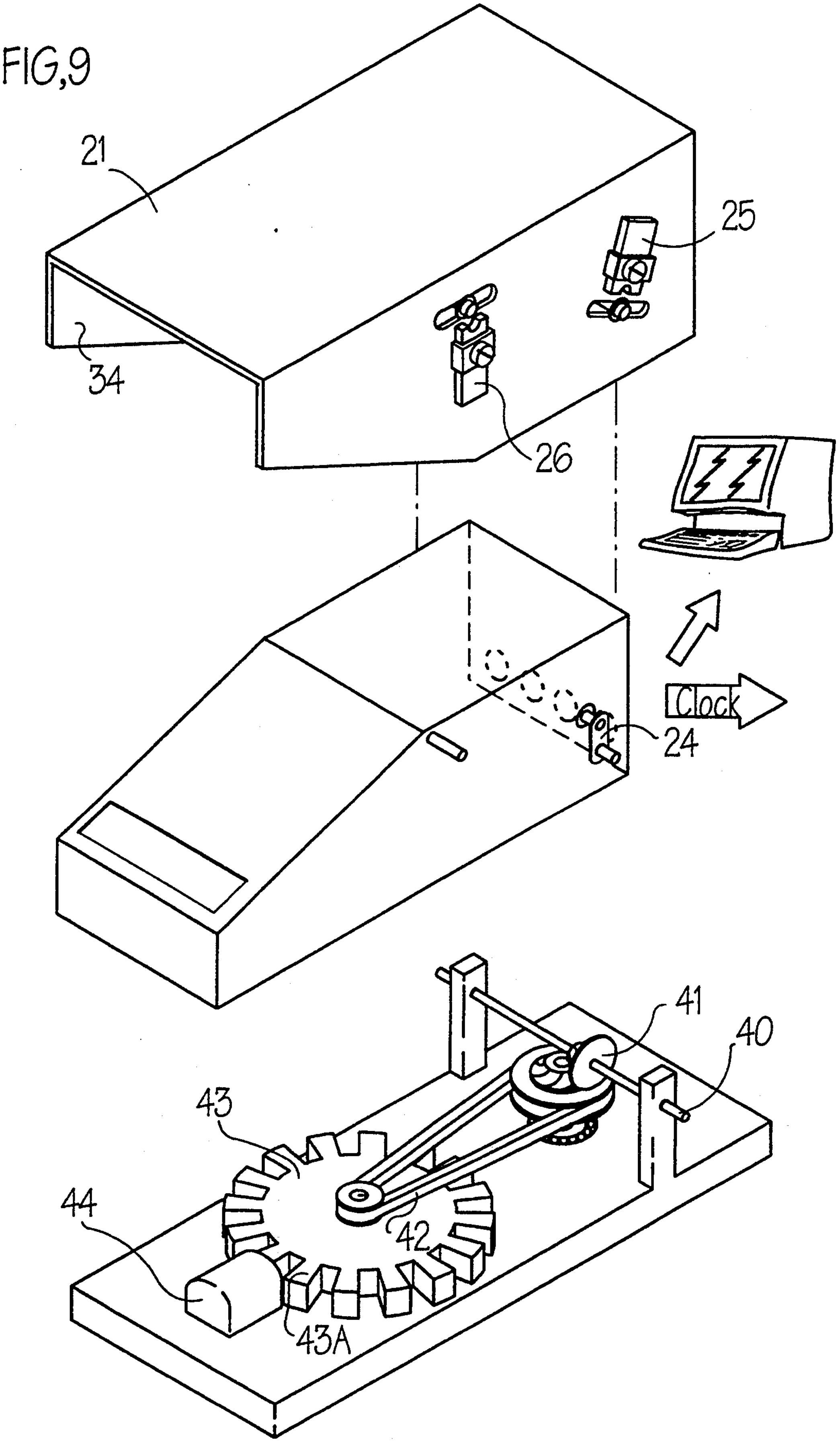
Figure 11A:
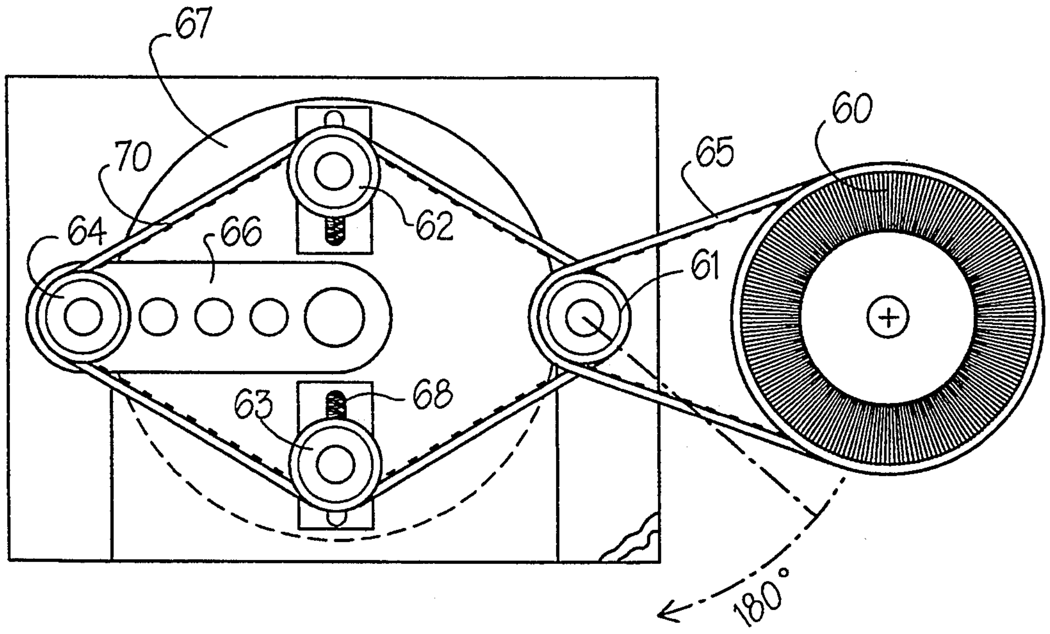
Figure 11B:
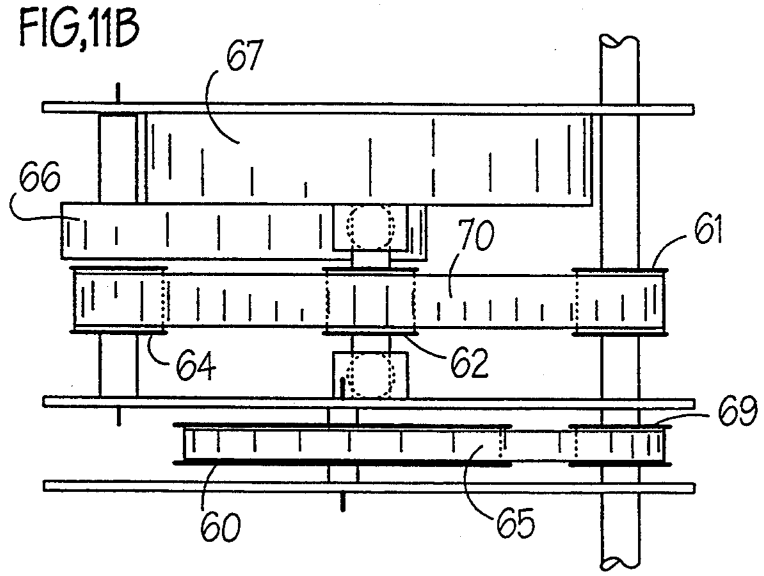
Figure 12:
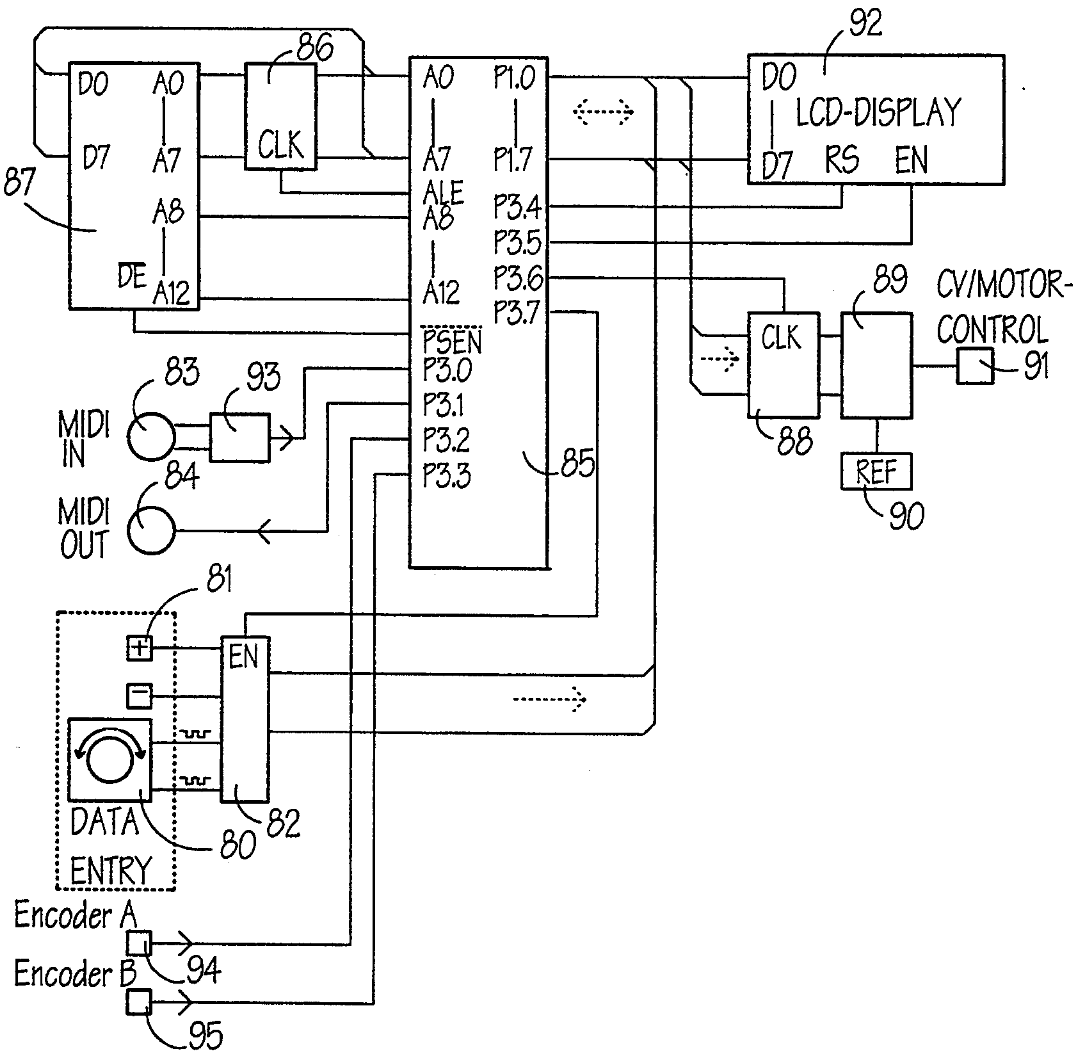
Figure 13:
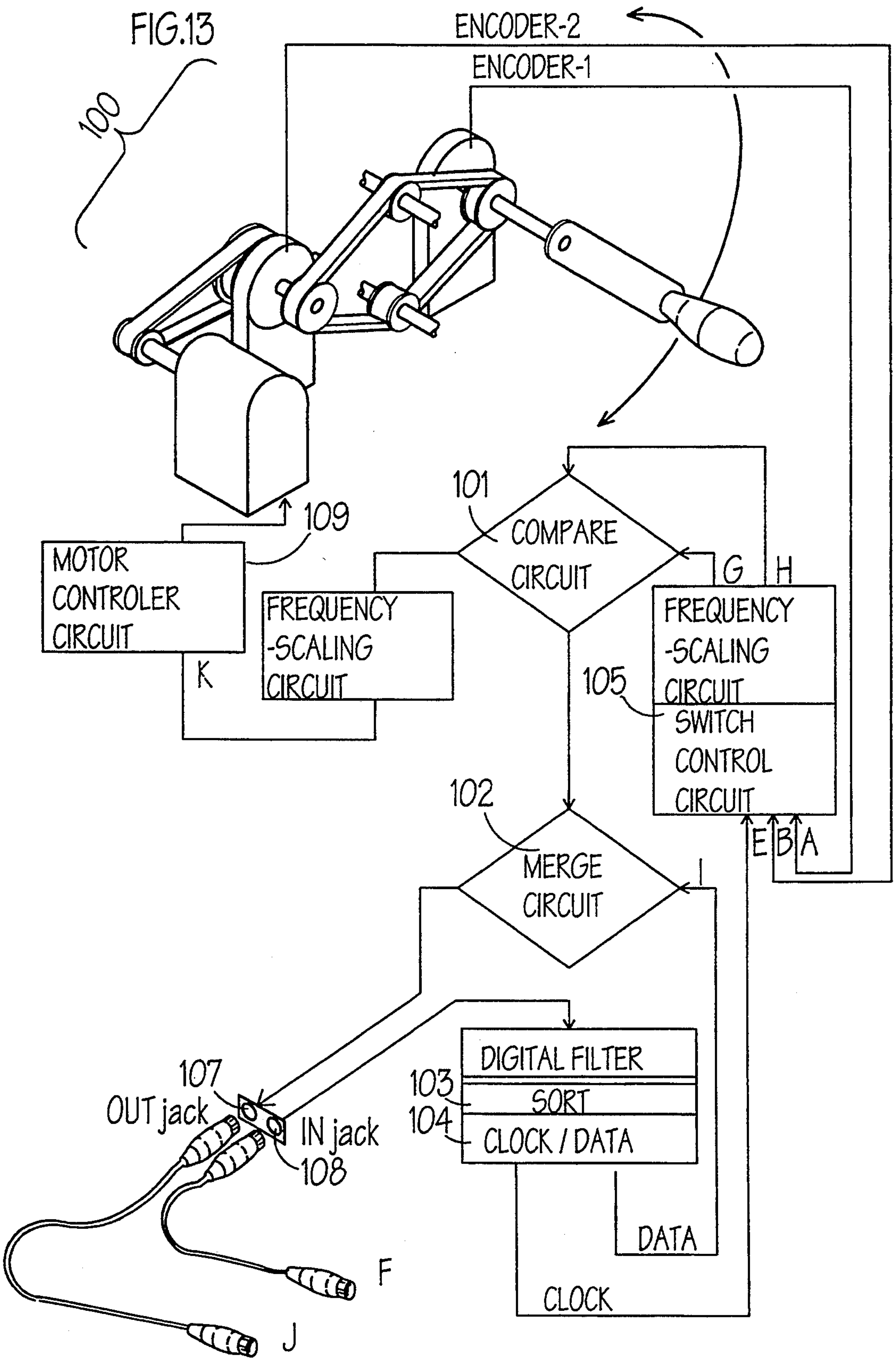
Figure 16:
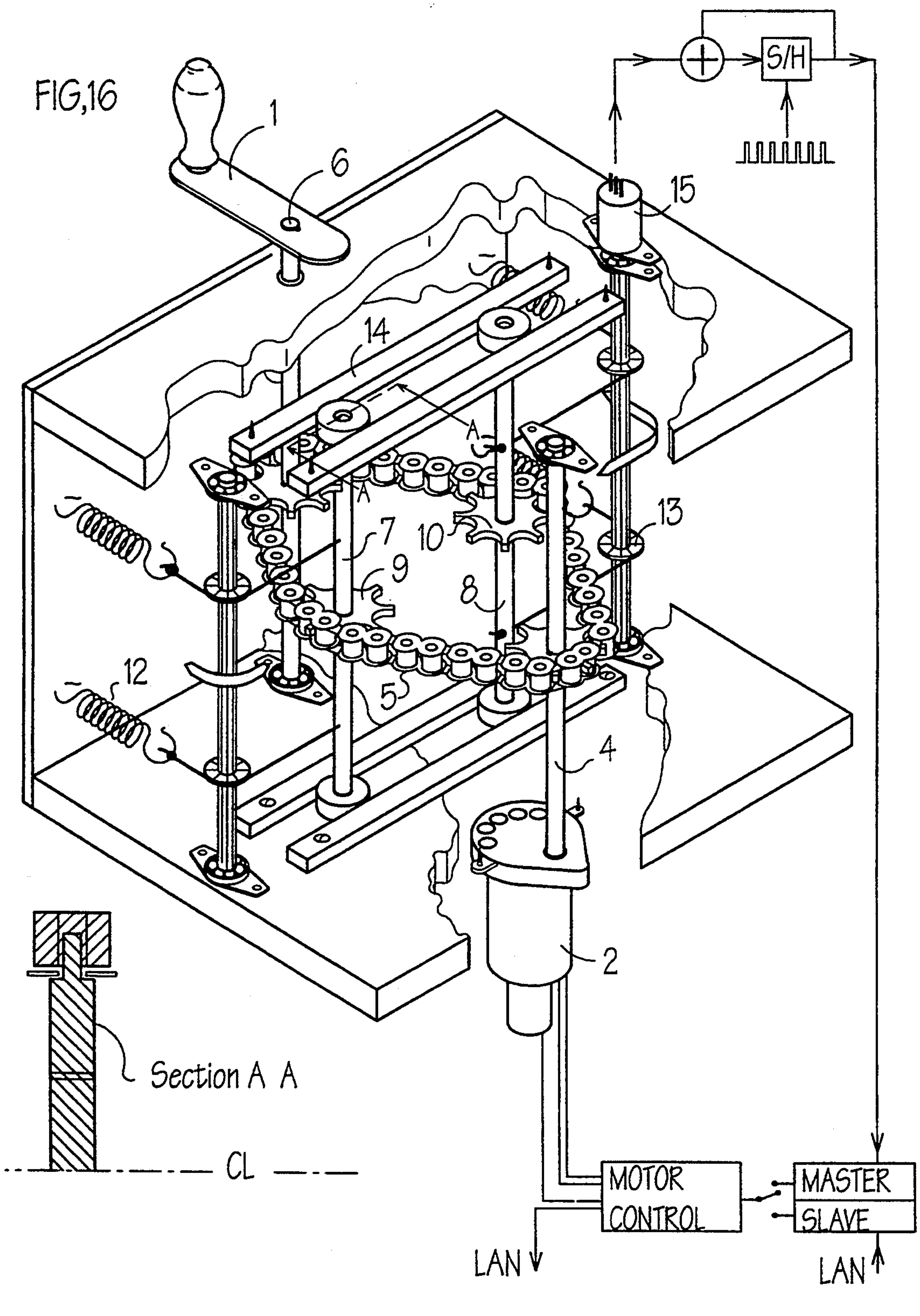

FIG. 9 shows a further embodiment of the present invention,

FIG. 10 shows a part of a further embodiment of the present invention which is a modification of the embodiment shown in FIG. 4, FIGS. 11*a* and 11*b* show a modification to the embodiment of FIGS. 5*a* and 5*b*, FIG. 12 shows a schematic diagram of a control circuit according to the present invention, FIG. 13 shows a schematic block diagram of data flow in the man/machine interface in accordance with the present invention, FIG. 14 shows a flow diagram of the operation of the man/machine interface in accordance with the present invention, FIG. 15 shows schematically the arrangement of several man/machine interfaces and a network in accordance with the present invention, FIG. 16 shows a further embodiment of the present invention, FIG. 17 shows a schematic electronic circuit diagram of a control circuit for use with the embodiment shown in FIG. 16.

In a generalized system controlled by clock pulse data the clock pulse data are either continuous and regular for instance with an active robotic system or are prerecorded and variable as in the case of a music synthesizer. In order to achieve a useful man-machine interface, it is necessary to be able to carry out the following functions. Firstly, it is necessary that the human being is capable of sensing the timing generated by the computer control system. In the following, this mode of operation will be described as the slave mode of the man/machine interface. At other times it is necessary for the human being to be able to determine the timing of the computer controlled system. In this case, the man-machine interface is operated in the master mode. In still other cases it is necessary that the timing generated by the machine must be amended or edited which will be described as the edit mode in the following. These functions can be provided in separate man-machine interfaces or can be combined in a single unit.

Slave Mode

The object of this mode is to be able to provide a human being operator with information relating to the timing of the machine. Obviously, the human operator could observe the movements of the robot or listen to the music being played by the synthesizer and thus be able to identify alterations in the timing. However, this method involves too much attention on the part of the human being who is to coordinate his activities with the machine. It is advantageous if timing information can be recognized by the human being without involving so much attention on his part. In the following, the proposed solution to this problem is a footpedal which is driven by a motor whose speed is determined by the timing generated by the machine. Obviously, as the timing generated by the machine alters the speed of the motor alters and the movement of the footpedal is speeded up or slowed down. By resting a foot on the footpedal it is possible therefore to obtain direct tactile information relating to the timing or the machine. The invention however is not limited to a footpedal but could also be carried out in the form of flashing lights or moveable arms in order to give an optical and not a tactile signal to the human being. These latter methods however are not preferred as it is advantageous when the human being may make use of his eyes, ears, fingers, arms etc. for other activities rather than making use of these in order to receive the timing information from the machine. In general, a footpedal is found to be the most suitable as most human activities involve the arms and fingers and eyes and leave the feet free for other activities.

Master Mode

According to an embodiment of the present invention, the man-machine interface in the master mode is provided by a footpedal which is capable of generating timing and data in a form suitable for use with the machine. Again, the invention is not limited to a footpedal but may be any device driven by other parts of the body such as the fingers or arms. The important point about the master mode footpedal is that it is capable of generating a sufficient number of timing data so that the machine can respond correctly. In the abovementioned prior art devices for instance, allowance is made for generating timing pulses with a footpedal of a single musical note or a musical bar. The system must interpolate between these individual events. It is however much more advantageous to have a footpedal which generates a large number of timing pulses so that also gradations or timing between notes or within one bar can be adequately carried out.

A further important aspect of the man/machine interface in the master mode is that the timing data may first be set by the operator and then the timing maintained until a further adjustment is required. In the case of a footpedal this allows the operator to set the timing speed with the footpedal and then remove his foot and the footpedal continues to generate timing pulses in accordance with the set speed.

Edit Mode

An edit mode man-machine interface in accordance with an embodiment of the present invention is also constituted by a foodpedal which is driven by the prerecorded timing pulses. In the footpedal or in a device operatively linked to the footpedal, a clock sequencer is provided which edits each bit of timing data based on the condition of the footpedal. In general, the footpedal is driven by the timing data of the machine. However, if the operator wishes to speed up or slow down the speed of operation of the machine, he may do so by exerting more or less pressure on the footpedal in order to speed it up or slow it down. The increased speed or decreased speed of operation of the footpedal is provided as an output to the clock sequencer. Each individual bit of timing data is then increased or decreased in length according to the information which is sent from the footpedal. This editing is done on a real time basis and if necessary, the edited data can be restored so that the next time that the machine is operated the edited timings are used. Alternatively, the edited timing data is not stored and the original data is maintained.

The invention will now be described in the form of a footpedal for sequencing music and the multimedia data and in particular a footpedal which includes a means for generating a clock pulse. In particular, reference is made to "MIDI" in Theorie and Praxis" Elector Verlag, 1990 which discloses details relating to the technological background of the present invention and should be therewith.

FIG. 4 shows a general view of a footpedal according to the present invention although the invention is not limited to the footpedal but applies to any form of tempo clock generating means.

In FIG. 4 the foot of the musician is placed upon the surface (21) of the moveable footpedal (34). By rocking the moveable footpedal (34) the crank arm (24) is caused to rotate in a circular motion. The crank arm is fixed to the shaft (33) on which a drive wheel (18) is also mounted. Rotation of the drive wheel (18) drives the rotary encoder (29) which is operatively connected to the shaft (33). The rotary encoder (29) outputs tempo click data as electronic pulses. The output of the encoder (20) is supplied to for instance, a multi-media network (not shown in detail). By use of the encoder (29) it is possible to operate the footpedal in time with the beat of the music and also to be able to generate in the master mode the large number of tempo click pulses required. For instance, if the click pulses are generated at one 96th of a note duration the rotary encoder should supply 96 pulses for each rotation. Such rotary encoders e.g. optical encoders are well known to a person skilled in the art.

In the above described master operation mode the footpedal is the master for tempo in the network. The footpedal can however be operated in the slave mode. The footpedal includes a motor (14) driven by a power supply (23). The rotational speed of the motor can be (slave mode) determined by the tempo click data output of the network. The motor can be a synchronous motor with a motor control system such as HD 63140, Universal pulse processor from Hitachi (see FIG. 8) or any other motor whose rotational speed can be set relatively accurately. The motor drives a drivewheel (15) located on a shaft (32) by means of a drive belt (16) or similar transmission means. A second rotary encoder (28) may optionally be connected to the shaft (32) so that on each rotation of the shaft (32) a series of electrical pulses are output from the rotary encoder. These pulses also have a form similar to the conventional tempo click data pulses.

In a further embodiment of the present invention the output of the rotary encoder (28) may be fed to a decision circuit (not shown) in the form of a feedback loop so that the actual rotation speed of the motor can be compared with the set speed of the motor and any determined difference may be corrected either by the network or by using logic circuits in the footpedal capable of comparing the outputs of encoders (28) and (29) which will be described later. A drivewheel (17) is mounted on the other end of the shaft (32) from the drivewheel (15) and the drivewheel (17) is operatively connected to the mechanical interface drivewheel (18) via a drive belt (31) or any other equivalent transmission means.

The operation of the footpedal will now be described. In the slave mode the musician rests his foot on the footpedal and makes no attempt to influence the footpedal, the motor (14) receives the tempo click data pulses from the network and is driven at a frequency corresponding to these pulses. Via the drive belt (16) and (31) and the drivewheels (15,17,18) the moveable footpedal (34) is driven at the beat rhythm of the music as determined by the tempo generating clock of the network. In this mode of operation, the musician receives a tactile dynamic indication of the tempo of the music to be played through his foot thus leaving his hands and arms free to play an instrument in synchronism with synthetically produced music from the sequencer. Further, optical or acoustical tempo information (metronome) is not used in order to indicate the tempo of the music and therefore, the concentration of the musician in reading the music, listening to other players or to the output of the network or observing a video film to which the music must be matched is not disturbed.

To improve the operation in the slave mode, the output of one of the encoders (28) is compared with received external tempo clock data in a comparison (not shown) and the motor speed controlled as a result of this comparison.

Should the musician wish to alter the tempo of the music being played, he is able to do so by switching to master mode and exerting pressure with his foot upon the footpedal to either increase the speed of rotation or decrease the speed of rotation of the mechanical interface drivewheel (18). By so doing, he overrides the motor and the speed of operation of the footpedal is then determined by the musician. The outputs of the rotary encoders (28,29) are compared in a comparison/decision circuit (described later). Should a discrepancy between the speed of encoders (28,29) occur, the device is controlled to speed up or slow down the tempo clock pulse rate (see FIG. 7A). In a further embodiment of the present invention either slave or master modes may be selected by using the function keys (35). In the master mode, the footpedal determines the timing and the network has to follow the tempo command of the footpedal. In the master mode it is not necessary for the musician's foot to be continuously on the pedal. Again with reference to FIG. 7A the musician taps out a certain speed mechanically. By comparing the outputs of the encoders any speed difference can be determined and the network sends appropriate signals to delay or accelerate the motor in the footpedal. Once the footpedal has been moved to give a certain tempo, the timing will remain constant until the musician makes a further alteration.

In the above-mentioned embodiments of the present invention the movement of the footpedal is a simple rocking motion as shown in FIG. 5*b*. However, a more suitable motion may be provided by the appropriate mechanical arrangement such as the scroll movement shown in FIG. 5*a*. With reference to FIG. 4, the use of the adapters (25,26) may be provided to convert the rocking motion into the scroll motion as mentioned above.

The exact movement of the footpedal can have an important effect on maintaining correct timing. With a simple tapping motion there is a tendency to move the foot quickly and then to pause with the foot down. Converted into continuous clock pulses this would result in a non-uniform rate of pulses. A scroll movement provides more control over the rate of clock pulses generated at all times and therefore gives improved sequencing within one beat of the music.

A further embodiment of the present invention is shown in FIG. 5 in which two idler wheels (19) and (20) are mounted on axles which are held by elastic elements such that the wheels (19) and (20) are forced apart from each other thus tensioning the drive belt (31). As shown in FIG. 6*a*, when the musician attempts to drive the footpedal faster than the motor speed, the tension in the top part of the drive belt (31) increases thus depressing the wheel (19). Therefore, the drivewheel (18) moves through an angle $\alpha$ before the increased speed of the drivewheel (18) is transmitted in the drivewheel (17). Alternatively, as shown in FIG. 6*b*, when the motor is attempting to drive the footpedal faster than the musician's foot, alternatively, the musician is attempting to slow down the footpedal, the tension increases in the bottom part of the belt (31) and the wheel (20) moves upwards against the sprung force. In this way, the drivewheel (17) moves through an angle $\beta$ before the speed differences between drivewheel (17) and drivewheel (18) are eliminated. The difference in angle between the drivewheels (17, 18) can be detected by comparing the outputs of the encoders (28, 29). Alternatively, a mechanical linkage system can be provided which measures the angular difference directly and outputs an appropriate signal. This output signal may be used to control the network on the motor (14).

In a further embodiment of the present invention the change from master to slave is carried out in one cycle of the device. In this way, on the down stroke of the footpedal, the footpedal is in control and supplies clock data to the network. As the footpedal charges to moving upwards the master control is switched to the slave mode so that the footpedal is driven on the upstroke by the driving means according to the timing pulses from the network.

A simplified version of the footpedal is shown in FIG. 9 which is suitable for operation in the master mode. The same reference numbers refer in FIG. 9 to components which are shown in FIG. 4 and are described in the accompanying text. In the device according to FIG. 9, the crank (24) drives the spindle (40) when the footpedal is operated. Rotation of the spindle (40) drives the gear arrangement (41) which is connected to a encoder flywheel (43) via a drive band (42). The encoder flywheel (43) has the typical property of a flywheel of being able to store angular momentum and is also provided with a sequence of irregularities (43*a*) on its circumference which are detected by a detector (44). The irregularities could be in the form of teeth as shown in FIG. 9 which are detected by a Hall sensing device located in the detector (44). Alternatively, optical sensing devices could be used in order to convert the rotation of the flywheeling coder (43) into a series of clock pulses. The incrtia of the flywheel encoder (43) is such that once the footpedal is set in motion by the musician it remains with gradually reducing speed for some time. This arrangement is a simple form of footpedal for use in the master mode, in which the maintenance of the timing pulses is carried out by inertial means.

The device of FIG. 10 is a mode compact version of the device shown in FIG. 4. The device of FIG. 10 has two encoders (50) and (54) equivalent to the two encoders (28) and (29). The two encoders (50) and (54) are attached to two shafts (51) and (55) which are connected together mechanically by an elastic belt (57) and a gear box (53). The footpedal is connected by a crank system (not shown) to shaft (55). This arrangement provides the elastic slip mechanism described with reference to FIGS. 5*a* and 5*b* by extension of the elastic belt. One particular advantage of this embodiment is that the motor flywheel and encoder are all provided in a single wheel (50). In the circumference of the wheel, magnets (59) can be provided which are sensed by a Hall sensor and generate the clock pulses for the device. The tension in the elastic belt (57) can be adjusted by means of the screw (52). A further advantage is that the shafts for the drive wheels (19) and (20) of FIG. 4 are not required.

A further embodiment of the present invention is shown in FIGS. 11*a* and 11*b* which shows a further modification of the device shown in the FIGS. 5*a* and 5*b*. The motor drive (67) is connected to the encoder (60) via the wheels (61, 62, 63 & 64) and elastic belts (65, 66 & 70). The footpedal is connected to the shift driving wheels (61) and (69). This arrangement provides a degree of elastic slip between the encoder (60) and the motor (67). It is also possible to provide the system according to FIG. 11*a* so that the shafts (62 & 63) are mounted on elastic bearings so that a further additional slip is provided in the system. In this figure, an optical encoder is shown.

FIG. 11*b* shows a more compact version of the arrangement shown in FIG. 11*a* in which the reference numbers have the same meaning as in FIG. 11*a*.

In the above embodiments involving one or two encoders and a motor it is necessary to provide a control circuit for driving the motor. For instance, when the footpedal is used in the master mode it is sometimes convenient to set the motor speed and then to leave the device running without requiring further adjustment in the short term. This means that the musician can set the speed with an initial movement of the footpedal and then can remove his foot from the footpedal in order to carry out other functions. Setting a motor speed using a motor speed control system is well known in the prior art, for instance, from GB-A-2 01 79 75. In such known systems the speed of the motor is set by generating a reference voltage which is proportional to the speed to be set. This reference voltage is then compared with a voltage fed back from an encoder on the motor drive spindle and when a difference is detected, appropriate action is carried out to speed up or slow down the motor. Such a speed control could be applied to the footpedal embodiments described above however this is not an optimal solution. The object of the present invention is to provide dynamic tactile time control between the human being and a passive or active robotic device. A preferred embodiment of the present invention involves a control system in which the speed of rotation of the motor is set by moving the footpedal in the normal way. After a short "learn phase" the timing set by the musician is then continued until a further change is made. In order to maintain the set speed a feedback differential circuit can be used which differentiates the rate of generation of the clock pulses and feeds an output signal back to the motor control circuit. Provided the clock pulses remain constant the output of the feedback circuit is of course zero and therefore there is no alteration made to the motor speed. On the other hand, if the clock pulse rate alters, the differentiation circuit will generate an appropriate pulse proportional to the rate of change of the clock pulses and this signal may then be fed back for adjustment of the motor speed in order to maintain the rate of clock pulses to be constant. In order to make a further adjustment in tempo it is necessary to decouple the differentiation feedback circuit for a period of time so that the device can "learn" the new speed. The decoupling of the differentiation circuit can be done by the function switches (35) when appropriately programmed and may be operated by the foot of the musician. Alternatively, the system can be programmed so that if the musician overrides the motor by placing his foot on the footpedal and forcing the footpedal to follow a different timing that after a certain period of time has elapsed in which a difference exists between the set speed and the actual speed the differentiation circuit is automatically disconnected and the new clock rate setting is "learned".

A control circuit which may be used with any of the embodiments according to the invention is shown in FIG. 12. The outputs on the two encoders A and B are entered via the interfaces (94) and (95) and are inputted to the 8 bit single chip microcontroller (85). The 8 bit single chip microcontroller includes a microprocessor as well as two timer serial interfaces for bidirectional 8 bit ports as well as a 256 byte RAM. The output or input to the main network is carried out via the interfaces (83) and (84). Between the input interface (83) and the 8 bit single chip microcontroller (85) an optical coupler (93) can be connected in order to separate the footpedal control circuit electrically from the network. The software for driving the 8 bit single chip microcontroller is stored in an EPROM (87). Between the EPROM (87) and the 8 bit single chip microcontroller (85) an 8 bit register (86) may be connected as a buffer memory in order to store addresses until the multiplex address data bus of the 8 bit single chip microcontroller (85) is free.

Data entry to the system may be carried out either by function keys (81) or by a data entry device (80) such as a keyboard. The function keys (81) may be located upon the footpedal or may be located externally from the footpedal. The 8 bit bus transceiver (82) is used to control the input of data from the function keys (81) or the data entry device (80) to the 8 bit single chip microcontroller (85).

The software programme stored in the EPROM (87) is executed by the 8 bit single chip microcontroller (85). For instance, the pulse rates from encoder A and encoder B are compared and a single generated which is proportional to a difference. Alternatively, in the master mode the output from one of the encoders A and B is differentiated and a signal generated which is proportional to the differentiated values. The output of the 8 bit single chip microcontroller (85) is supplied to the motor via the motor control interface (91). The 8 bit latch (88) latches the 8 logical levels supplied from the 8 bit single chip microcontroller (85) to the input thereof and the 8 bit digital analog converter (89) converts the 8 bit signal to a voltage which is related to the 8 bit binary value. This voltage is then used to control the motor speed. In order to calibrate the analog digital converter a reference voltage source (90) is supplied to the A/D converter (89).

Optionally, an LCD display (92) may be connected to the 8 bit single chip microcontroller (85) in order to display the various outputs and the conditions of the device.

As a further embodiment of the present invention, several musicians may each operate a footpedal switch according to the present invention. The tempo click data pulses from the plurality of the encoders are then supplied to the 8 bit single chip microcontroller through a plurality of encoder interfaces (94) and (95). The software programme stored in the EPROM (87) then includes priority information for operating on the plurality of encoder inputs. The software programme may involve averaging the tempos from each footpedal alternatively deciding the priority of the tempo data from the plurality of footpedals according to a predetermined hierarchial scheme. The priority of the various footpedals may also be inputted via the data entry device (80) or the function switches (81).

The circuit of FIG. 12 may also operate as a through-circuit on a network. The network could be a commercially available network such as the MIDI system. When operating as a through-circuit the data from the network is input through the interface (83) and the optical coupler (93) to the 8 bit single chip microcontroller (85). The data input includes information relating to characteristics of each note such as frequency and duration as well as clock pulses which determine the overall sequencing of the various devices in the network. This information is contained in frames in which the information is located in a series fashion. In order to alter the basic clock pulse rate it is first necessary to extract the clock pulse data from the other data in the frame. Having done so it is then possible to amend the clock pulse rate depending upon the output of the encoders from the footpedal. In order to carry out this amendment, it is necessary to assign a relationship between the footpedal internal timing and the network timing. This can be carried out by suitably programming or by a separate frequency scaling circuit. Subsequently, it is necessary to merge the extracted data with the modified clock pulse data. The information which has now been modified is then output through the network output (834) back to the system Obviously, this modification should be carried out as close to possible in real time so as not to introduce delays in the network.

FIG. 13 is a schematic diagram of the footpedal of FIG. 4 with the electronic circuit of FIG. 12. Data from the network is input to the input IN jack (108) and is then sorted into clock pulse data and other data in the sorting circuit (103). The clock pulse data and other data are then output from the clock/data circuit (104). Due to a slight delay in processing the clock data a buffer memory can be included in the clock/data circuit in order to temporarily store the other data before outputting it to the merge circuit (102). The clock pulse data is compared with data from the encoders (1) and (2) in the compare circuit (101) after suitable frequency scaling in the frequency scaling circuit and the modified clock pulses are supplied to the merge circuit (102) where they are combined again with the other data (I) and are output to the network OUT jack (107). The compare circuit (101) can also output a motor controller signal (K) which is supplied to the motor controller circuit (109) for controlling the motor (110). The connections of the clock/data circuit and the encoders to the compare circuit (101) is controlled by a switch control circuit (105).

FIG. 14 is a schematic diagram of the various operational modes of the footpedal in accordance with the embodiments of the present invention. The footpedal including the electronic circuit such as shown in FIG. 12 is capable of being operated in three different operation modes: master, slave and clock sequencer. In the master mode the clock pulse rate is determined by the footpedal. In the slave mode the clock pulse rate is determined by another device in the network and the footpedal is driven in accordance with this external clock pulse rate. The clock sequencer mode is used when a series of footpedals is used and it is necessary to include the outputs from the various footpedals in order to determine the appropriate clock pulse rate (FIG. 15).

With reference to FIGS. 13 and 14, in the master mode the other data (I) is transferred from the clock/data circuit (104) to the merge circuit (102). The signal from the encoder (1) is transferred via the switch control circuit (105) from the node (A) to the node (G) and the signal from encoder (2) is transferred via the switch control circuit (105) from the node (B) to the node (H). Both these signals are then transferred to the compare circuit (101). The compare circuit (101) compares the signals from encoder (1) and encoder (2) and if a discrepancy occurs, an appropriate control signal (K) is output to the motor control circuit (109) in order to adjust the motor speed. The compare circuit also supplies a clock signal based on the signals from encoder (1) and encoder (2) to the merge circuit (102) in which data from the clock/data circuit (104) is merged with the clock pulse data from the compare circuit (101) and is then output to the circuit via the network OUT jack (107).

In the slave mode the clock pulse data sorted by the sort circuit (103) and output by the clock/data circuit (104) is supplied directly to the motor controller circuit (109) via the node (E), the switch control circuit (105) and the compare circuit (101).

The clock sequencer mode is shown in more detail in FIG. 15. A series of footpedals (100) are connected to a clock sequencer (110) which is either a device external to the footpedals or can be included in one of the footpedals which is then considered to be a master footpedal. The clock sequencer is capable of receiving the various signals from the footpedals (100) and is able to operate on these signals in accordance with predetermined heirarchy or democracy to produce a timing signal which is then supplied to the network which may be a MIDI LAN network or other type of network. For those footpedals which are not the master footpedal the clock/data circuit (104) does not output the other data (I) to the merge circuit and the node (E) is connected to the node (K) via the switch control circuit (105) and compare circuit (101). The output of the encoder (1) is supplied from the node (A) to the network output jack (J) via the switch control circuit (105), the node (G), the compare circuit (101) and the merge circuit (102).

In order to select the appropriate mode, the function keys (D) are used.

In the above embodiments, the footpedal device includes two encoders and the control circuits operate on the output of the two encoders using electronic processing techniques. It is however possible to construct the footpedal according to the present invention using electromagnetic devices. An embodiment of the present invention is shown in FIG. 16 diagramatically. The device is shown with a handle (1) rather than the footpedal arrangement of FIG. 4. However, the embodiment in accordance with FIG. 16 can be adapted for use with a footpedal. In the slave mode the motor (2) drives the shaft (4) which is mechanically connected to the shaft (6) and the handle (1) by the chain (5). This chain runs over two sprocket wheels (9) and (10) which are located on spindles (7) and (8). The spindle (7) and (8) are mounted on bearings between support rods (14). Springs (12) bias the spindles (7) and (8) outwards so as to tension the chain (5).

Any difference in speed between the handle (1) and the motor (2) results in a relative movement of the spindles (7) and (8). A movement of the spindle (8) results in rotation of the shaft (13) on which a rotary potentiometer (15) is mounted. When there is an angular difference between the position of the shaft (6) and the shaft (4) the spindles (7) and (8) are either moved close together or further apart which results in rotation of the shaft (13). Rotation of the shaft (13) results in an output from the rotary potentiometer (15). This output from the potentiometer is therefore proportional to the difference in angle between the spindle (6) and the spindle (4). The signal from the potentiometer (15) can then be used to control the motor (2) or to be fed to a clock pulse generator for increasing or decreasing the pulse rate appropriately.

The control circuit for the device shown in FIG. 16 is shown in FIG. 17 in which the change or resistance of the rotary potentiometer (15) is converted into a change in voltage signal because the potentiometer is connected to power supplies of plus or minus 5 volts and the voltage signal is fed to amplifier circuits which generate a motor control signal.

I claim:

1. Man/machine interface comprising:

pedal means for setting a driving speed of a means for generating a sequence of electrical timing pulses;

means for maintaining the set driving speed of said generating means;

said pedal means including a first rotating shaft;

said generating means including an encoder attached to said shaft;

said maintaining means including a motor operatively connected to said shaft and a motor control circuit for controlling the speed of said motor, said motor control circuit including differentiating means for determining a rate of change in the rotational speed of said first shaft and outputting a signal in accordance therewith, said motor control circuit driving said motor in accordance with said signal; and said differentiating means including a second shaft connected to the pedal means and operatively connected to the first shaft via elastic transmission means, and a potentiometer connected to said elastic transmission means so that the potentiometer outputs said signal in accordance with relative positions of the first and second shafts.

2. Man/machine interface according to claim 1, wherein said means for maintaining includes a flywheel attached to said first shaft.

3. Man/machine interface comprising:

pedal means for setting a driving speed of a means for generating a sequence of electrical timing pulses;

means for maintaining the set driving speed of said generating means;

said pedal means including a first rotating shaft;

said generating means including an encoder attached to said shaft;

said maintaining means including a motor operatively connected to said shaft and a motor control circuit for controlling the speed of said motor, said motor control circuit including differentiating means for determining a rate of change in the rotational speed of said first shaft and outputting a signal in accordance therewith, said motor control circuit driving said motor in accordance with said signal; and said differentiating means including a second shaft connected to said pedal means and operatively connected to said first shaft via elastic transmission means, a second encoder connected to said second shaft and said signal being generated by a comparison circuit for comparing the outputs of said first and second encoders.

4. Man/machine interface for use with network means for generating a data stream including external electrical timing pulses comprising:

pedal means; and driving means adapted to drive said pedal means in accordance with said external electrical timing pulses.

5. Man/machine interface according to claim 4, wherein extracting means are provided to extract said external electrical timing pulses from said data stream.

6. Man/machine interface according to claim 1 or 5, wherein said pedal means includes a rotating shift and an encoder attached thereto.

7. Man/machine interface according to claim 6, wherein said driving means includes a control circuit for comparing the output of said encoder with said external electrical timing pulses and outputting a signal in accordance with the comparison and said driving means is driven in accordance with said signal.

8. Man/machine interface according to claim 6, further comprising means for editing the extracted external electrical timing pulses, said editing being carried out in accordance with the output from said encoder, and means for merging the edited extracted external electrical timing pulses with said data stream.

9. Multimedia network comprising at least one man/machine interface in accordance with any one of the claims, 1 to 8.

* * * * *

UNITED STATES PATENT AND TRADEMARK OFFICE

CERTIFICATE OF CORRECTION

PATENT NO. : 5,382,891

DATED : JANUARY 17, 1995

INVENTOR(S) : GUY HUFFENER

It is certified that error appears in the above-indentified patent and that said Letters Patent is hereby corrected as shown below:

In Column 1, line 58, delete "Elecktor" and insert --Elektor-- in its place.

In Column 2, line 7, delete "gpm" and insert --qpm-- in its place.

In Column 2, line 14, delete "SPROJECT" and insert --PROJECT-- in its place.

In Column 3, line 51, delete "claim 1 or claim 7" and insert --claim 1 or claim 4-- in its place.

In Column 5, line 33, delete "or" and insert --of-- in its place.

In Column 6, line 2, delete "Elector" and insert --Elektor-- in its place.

In Column 6, line 19, delete "20" and insert --29-- in its place

In Column 7, line 48, delete "5b" and insert --6b-- in its place.

In Column 7, line 51, delete "5a" and insert --6a-- in its place.

In Column 8, line 1, delete "6a" and insert --5a-- in its place.

In Column 8, line 13, delete "angle " and insert --angle and-- in its place

In Column 8, line 26, delete "charges" and insert --changes-- in its place.

In Column 8, line 39, delete "a" and insert --an-- in its place.

UNITED STATES PATENT AND TRADEMARK OFFICE
CERTIFICATE OF CORRECTION

PATENT NO. : 5,382,891 Page 2 of 3

DATED : JANUARY 17, 1995

INVENTOR(S) : GUY HUFFENER

It is certified that error appears in the above-indentified patent and that said Letters Patent is hereby corrected as shown below:

In Column 8, line 49, delete "incrtia" and insert --inertia-- in its place.

In Column 9, line 12, delete "shift" and insert --shaft-- in its place.

In Column 10, line 39, delete "single" and insert --signal-- in its place.

In Column 10, line 64, delete "programme" and insert --program-- in its place.

In Column 11, line 29, delete "834" and insert --84-- in its place.

In Column 12, line 60, delete "The spindle" and insert --The spindles-- in its place.

In Column 14, claim 6, line 31, delete "claim 1 or 5" and insert --claim 4 or 5-- in its place.

UNITED STATES PATENT AND TRADEMARK OFFICE

CERTIFICATE OF CORRECTION

PATENT NO. : 5,382,891
DATED : January 17, 1995
INVENTOR(S) : Guy Huffener

It is certified that error appears in the above-indentified patent and that said Letters Patent is hereby corrected as shown below:

Column 14, claim 6, line 32, delete "shift" and insert --shaft--

Signed and Sealed this

Twenty-seventh Day of June, 1995

Attest:

BRUCE LEHMAN

*Attesting Officer*

*Commissioner of Patents and Trademarks*